United States Patent
Tuttle

(10) Patent No.: US 7,973,644 B2
(45) Date of Patent: Jul. 5, 2011

(54) SYSTEMS AND METHODS FOR RFID TAG ARBITRATION WHERE RFID TAGS GENERATE MULTIPLE RANDOM NUMBERS FOR DIFFERENT ARBITRATION SESSIONS

(75) Inventor: John R. Tuttle, Boulder, CO (US)

(73) Assignee: Round Rock Research, LLC, Mt. Kisco, NY (US)

(*) Notice: Subject to any disclaimer, the term of this patent is extended or adjusted under 35 U.S.C. 154(b) by 1192 days.

(21) Appl. No.: 11/700,525

(22) Filed: Jan. 30, 2007

(65) Prior Publication Data

US 2008/0180221 A1    Jul. 31, 2008

(51) Int. Cl.
  *H04Q 5/22* (2006.01)
(52) U.S. Cl. ........... 340/10.1; 340/10.2; 340/10.5; 340/10.51; 340/10.52; 340/3.41
(58) Field of Classification Search ............ 340/10.2
  See application file for complete search history.

(56) References Cited

U.S. PATENT DOCUMENTS

| | | | |
|---|---|---|---|
| 4,075,632 A | 2/1978 | Baldwin et al. | 343/6.8 |
| 4,761,778 A | 8/1988 | Hui | 370/46 |
| 4,796,023 A | 1/1989 | King | |
| 4,799,059 A | 1/1989 | Grindahl et al. | 340/870.03 |
| 4,845,504 A | 7/1989 | Roberts et al. | 342/457 |
| 4,862,453 A | 8/1989 | West et al. | 370/314 |
| 4,926,182 A | 5/1990 | Ohta et al. | 342/44 |
| 4,955,018 A | 9/1990 | Twitty et al. | 370/85.1 |
| 4,969,146 A | 11/1990 | Twitty et al. | 370/85.1 |
| 5,019,813 A | 5/1991 | Kip et al. | 340/825.54 |
| 5,025,486 A | 6/1991 | Klughart | 455/54 |
| 5,046,066 A | 9/1991 | Messenger | 370/94.1 |
| 5,055,968 A | 10/1991 | Nishi et al. | 361/395 |
| 5,121,407 A | 6/1992 | Partyka et al. | 375/206 |
| 5,124,697 A | 6/1992 | Moore | 340/825.53 |
| 5,142,694 A | 8/1992 | Jackson et al. | 455/67.11 |
| 5,144,313 A | 9/1992 | Kirknes | 342/42 |

(Continued)

FOREIGN PATENT DOCUMENTS

EP    0 779 520    9/1997

(Continued)

OTHER PUBLICATIONS

ECC Report 1, "Compatability between Inductive LF and HF RFID Transponder and Other Radio Communication Systems in the Frequency Ranges 135-148.5 kHz, 4.78-8.78 MHz and 11.56-15.56 MHz", *Electronic Comm. Committee*, 14 pp. (Feb. 2002).

(Continued)

*Primary Examiner* — Benjamin C Lee
*Assistant Examiner* — Curtis J King
(74) *Attorney, Agent, or Firm* — Lerner, David, Littenberg, Krumholz & Mentlik, LLP

(57) ABSTRACT

An RFID (radio frequency identification device) tag comprising a processor; a memory configured to store an identification number that distinguishes the tag from other tags; a transponder coupled to the memory and the processor, the tag being configured to arbitrate by selecting a random number, in response to an inventory query from a reader, and to respond to the reader depending on the random number selected, the tag being further configured for multiple concurrent inventory session arbitrations with multiple readers by separately storing random numbers for respective inventory session arbitrations. RFID readers, systems, and methods are also provided.

56 Claims, 7 Drawing Sheets

U.S. PATENT DOCUMENTS

| | | | |
|---|---|---|---|
| 5,144,668 A | 9/1992 | Malek et al. | 380/48 |
| 5,150,114 A | 9/1992 | Johansson | 340/825.08 |
| 5,150,310 A | 9/1992 | Greenspun et al. | 364/516 |
| 5,164,985 A | 11/1992 | Nysen et al. | 380/271 |
| 5,168,510 A | 12/1992 | Hill | 375/40 |
| 5,194,860 A | 3/1993 | Jones et al. | 340/370 |
| 5,231,646 A | 7/1993 | Heath et al. | 375/1 |
| 5,266,925 A | 11/1993 | Vercellotti et al. | 340/572 |
| 5,307,463 A | 4/1994 | Hyatt et al. | 395/275 |
| 5,365,551 A | 11/1994 | Snodgrass et al. | 375/141 |
| 5,373,503 A * | 12/1994 | Chen | 370/346 |
| 5,449,296 A | 9/1995 | Jacobsen et al. | |
| 5,461,627 A | 10/1995 | Rypinski | |
| 5,479,416 A | 12/1995 | Snodgrass et al. | 714/785 |
| 5,500,650 A | 3/1996 | Snodgrass et al. | 342/42 |
| 5,530,702 A | 6/1996 | Palmer et al. | |
| 5,550,547 A | 8/1996 | Chan et al. | |
| 5,583,850 A | 12/1996 | Snodgrass et al. | 370/342 |
| 5,608,739 A | 3/1997 | Snodgrass et al. | 714/785 |
| 5,619,648 A | 4/1997 | Canale et al. | 709/206 |
| 5,621,412 A | 4/1997 | Sharpe et al. | 342/51 |
| 5,625,628 A | 4/1997 | Heath | 370/321 |
| 5,627,544 A | 5/1997 | Snodgrass et al. | 342/42 |
| 5,640,151 A | 6/1997 | Reis et al. | 340/10.2 |
| 5,649,296 A | 7/1997 | MacLellan et al. | 455/38.2 |
| 5,673,037 A * | 9/1997 | Cesar et al. | 340/10.32 |
| 5,686,902 A | 11/1997 | Reis et al. | |
| 5,790,946 A | 8/1998 | Rotzoll | 455/343 |
| 5,805,586 A | 9/1998 | Perreault et al. | 370/346 |
| 5,841,770 A | 11/1998 | Snodgrass et al. | 370/346 |
| 5,914,671 A | 6/1999 | Tuttle | 340/10.42 |
| 5,936,560 A | 8/1999 | Higuchi | 341/106 |
| 5,940,006 A | 8/1999 | MacLellan et al. | 340/10.1 |
| 5,942,987 A | 8/1999 | Heinrich et al. | 340/10.42 |
| 5,952,922 A | 9/1999 | Shober | 340/572.4 |
| 5,966,471 A | 10/1999 | Fisher et al. | 382/253 |
| 5,974,078 A | 10/1999 | Tuttle et al. | 375/200 |
| 5,988,510 A | 11/1999 | Tuttle et al. | 235/492 |
| 6,038,455 A | 3/2000 | Gardner et al. | 455/447 |
| 6,061,344 A | 5/2000 | Wood, Jr. | 370/344 |
| 6,072,801 A | 6/2000 | Wood, Jr. et al. | 370/437 |
| 6,075,973 A | 6/2000 | Greeff et al. | 455/38.2 |
| 6,097,292 A | 8/2000 | Kelly et al. | |
| 6,104,333 A | 8/2000 | Wood, Jr. | 341/173 |
| 6,118,789 A | 9/2000 | Wood, Jr. | 370/462 |
| 6,130,602 A | 10/2000 | O'Toole et al. | 340/10.33 |
| 6,130,623 A | 10/2000 | MacLellan et al. | |
| 6,150,921 A | 11/2000 | Werb et al. | |
| 6,157,633 A | 12/2000 | Wright | 370/349 |
| 6,169,474 B1 | 1/2001 | Greeff et al. | 340/10.1 |
| 6,177,858 B1 | 1/2001 | Raimbault et al. | |
| 6,185,307 B1 | 2/2001 | Johnson, Jr. | |
| 6,192,222 B1 | 2/2001 | Greeff et al. | 455/106 |
| 6,216,132 B1 | 4/2001 | Chandra et al. | 707/103 R |
| 6,226,300 B1 | 5/2001 | Hush et al. | 370/437 |
| 6,229,987 B1 | 5/2001 | Greeff et al. | 455/38.2 |
| 6,243,012 B1 | 6/2001 | Shober et al. | |
| 6,265,962 B1 | 7/2001 | Black et al. | |
| 6,265,963 B1 | 7/2001 | Wood, Jr. | 340/10.4 |
| 6,275,476 B1 | 8/2001 | Wood, Jr. | 370/312 |
| 6,282,186 B1 | 8/2001 | Wood, Jr. | 370/462 |
| 6,288,629 B1 | 9/2001 | Cofino et al. | |
| 6,289,209 B1 | 9/2001 | Wood, Jr. | 455/277.1 |
| 6,307,847 B1 | 10/2001 | Wood, Jr. | |
| 6,307,848 B1 | 10/2001 | Wood, Jr. et al. | 370/329 |
| 6,324,211 B1 | 11/2001 | Ovard et al. | 375/219 |
| 6,415,439 B1 | 7/2002 | Randell et al. | |
| 6,459,726 B1 | 10/2002 | Ovard et al. | 375/219 |
| 6,480,101 B1 * | 11/2002 | Kelly et al. | 340/10.2 |
| 6,483,427 B1 | 11/2002 | Werb | |
| 6,566,997 B1 | 5/2003 | Bradin | 340/10.2 |
| 6,570,487 B1 | 5/2003 | Steeves | |
| 6,707,376 B1 | 3/2004 | Patterson et al. | 340/10.3 |
| 6,714,559 B1 | 3/2004 | Meier | |
| 6,771,634 B1 | 8/2004 | Wright | 370/349 |
| 6,778,096 B1 | 8/2004 | Ward et al. | |
| 6,784,787 B1 | 8/2004 | Atkins | |
| 6,850,510 B2 | 2/2005 | Kubler et al. | |
| 6,919,793 B2 | 7/2005 | Heinrich et al. | |
| 7,026,935 B2 | 4/2006 | Diorio et al. | 340/572.2 |
| 7,315,522 B2 | 1/2008 | Wood, Jr. | |
| 7,385,477 B2 | 6/2008 | O'Toole et al. | |
| 7,672,260 B2 | 3/2010 | Wood, Jr. | |
| 2003/0235184 A1 | 12/2003 | Dorenbosch | |
| 2005/0060069 A1 | 3/2005 | Breed et al. | |
| 2005/0207364 A1 | 9/2005 | Wood, Jr. | |
| 2006/0022800 A1 | 2/2006 | Krishna et al. | 340/10.2 |
| 2006/0022801 A1 | 2/2006 | Husak et al. | 340/10.5 |
| 2006/0022815 A1 | 2/2006 | Husak et al. | 340/505 |
| 2006/0056325 A1 | 3/2006 | Wood, Jr. | |
| 2006/0114103 A1 * | 6/2006 | Usami | 340/10.2 |
| 2006/0209781 A1 | 9/2006 | Wood, Jr. | |
| 2007/0139164 A1 | 6/2007 | O'Toole et al. | |
| 2007/0176751 A1 | 8/2007 | Cesar et al. | |
| 2007/0176756 A1 * | 8/2007 | Friedrich | 340/10.51 |
| 2008/0007412 A1 | 1/2008 | Wood, Jr. | |
| 2008/0042806 A1 | 2/2008 | Wood, Jr. | |
| 2008/0048832 A1 | 2/2008 | O'Toole et al. | |
| 2008/0048835 A1 | 2/2008 | O'Toole et al. | |
| 2009/0322491 A1 | 12/2009 | Wood, Jr. | |

FOREIGN PATENT DOCUMENTS

| | | |
|---|---|---|
| EP | 1072128 | 5/2008 |
| JP | 9054213 | 2/1997 |
| JP | 2002228809 | 8/2002 |
| WO | WO 97/48216 | 12/1997 |
| WO | 9943127 | 8/1999 |

OTHER PUBLICATIONS http://216.121.131.129/article/articleview/330/1/1/; "EPC Doesn't Infringe RFID Patents", *RFID Journal*, 2 pp. (Oct. 15, 2003).

Mullin, Eileen, "Electronic Product Code", www.baselinemag.com, 4 pp. (printed Oct. 15, 2003.

http://www.rfid.zebra.com/epc.htm, Electronic Product Code (EPC), 1 page (Printed Oct. 15, 2003).

http://www.eretailnews.com/features/0105epc1.htm, The Electronic Product Code (EPC), 2 pages (Printed Oct. 15, 2003).

http://www.eretailnews.com/Features/0105epcschema.htm, "The Electronic Product Code Schematic", 1 page (Printed Oct. 15, 2003).

http://www.eretailnews.com/features/epc.htm, The Electronic Product Code (EPC), 2 pp. (Printed Oct. 15, 2003).

http://www.rfidjournal.com/article/articleview/473/1/1/, "Second Source of Class 1 EPC Chips", *RFID Journal*, reprinted Oct. 15, 2003, 2 pp. (Jun. 26, 2003).

http://money.cnn.com/services/tickerheadlines/prn/cltu045.PI.09162003122727.24911.htm, "Manhattan Associates Announces Next-Generation Microsoft-Based RFID Solutions", *CNN Money*, reprinted Oct. 15, 2003, 3 pp. (Sep. 16, 2003).

Engels, Daniel, "Technical Report, The Use of the Electronic Product Code", *AUTO-ID Center, Massachusetts Institute of Technology*, 9 pp. (Feb. 1, 2003).

Auto-ID Center, Technical Report "13.56 MHz ISM Band Class 1 Radio Frequency Identification Tag Interface Specification: Recommended Standard", Version 1.0.0, *AUTO-ID Center, Massachusetts Institute of Technology*, 33 pp. (Feb. 1, 2003).

http://www.hightechaid.com/standards/18000.htm. "ISO/IEC 18000—RFID Air Interface Standards", 6 pp. (Printed Oct. 15, 2003).

ISO/IEC 18000-3-4, Automatic Identification—Radio Frequency Identification for Item Management—Communications and Interfaces—Part 3: Physical Layer, Anti collision System and Protocol Values at 13.56 MHz MODE 4, #ISO/WD 18000-3-v40-4, 29 pp. (Mar. 01, 2001).

ISO/IEC, "ISO/IEC 18000, Part 3, Information Technology AIDC Techniques—RFID for Item Management—Air Interface, Part 3, Parameters for Air Interface Communications at 13.56 MHz", #ISO IEC SC31 WG4 FCD18000-3, 174 pp. May 27, 2002).

International Standard ISO/IEC, "Final Committee Draft, ISO/IEC 14443-1, Identification Cards—Contactless Integrated Circuit(s) Cards—Proximity Cards, Part 1: Physical Characteristics", 9 pp. #ISO/IEC FCD 14443-1(1997).

ISO/IEC, "Final Committee Draft, ISO/IEC 14443-2, Identification Cards—Contactless Integrated Circuit(s) cards—Proximity Cards—Part 2: Radio Frequency Power and Signal Interface", Editor D. Baddeley, #ISO/IEC JTC/SC17/WG8, 16 pp. (Mar. 26, 1999).

Association Francaise de Normalization (AFNOR), "Identification Cards—Contactless Integrated Circuit(s) Cards—Proximity Cards—Part 3: Initialization and Anticollision", ISO/IEC, #ISO/IEC FDIS 14443-3:2000(E), 55 pp. (Jul. 13; Sep. 14, 2000).

Association Francaise de Normalization (AFNOR), "Identification Cards—Contactless Integrated Circuit(s) Cards—Proximity Cards—Part 4: Transmission Protocol", ISO/IEC, #ISO/IEC FDIS 14443-4:2000(E), 44 pp. (Jul. 13, 2000).

Association Francaise de Normalization (AFNOR), "Identification Cards—Contactless Integrated Circuit(s) Cards—Vicinity Cards—Part 1: Physical Characteristics", Final Draft, ISO/IEC, #ISO/IEC FDIS 15693-1:2000(E), 16 pp, (May 19, 2000).

Association Francaise de Normalization (AFNOR), "Identification Cards—Contactless Integrated Circuit(s) Cards—Vicinity Cards—Part 2: Air Interface and Initialization", Final Draft, ISO/IEC, #ISO/IEC FDIS 15693-2:2000(E), 23 pp. (Feb. 3, 2000).

ISO/IEC, "Identification Cards—Contactless Integrated Circuit(s) Cards—Vicinity Cards—Part 3: Anticollision and Transmission Protocol", #ISO/IEC CD 15693-3:1999(e), 48 pp. (Nov. 17, 1999).

ISO/IEC, "Automatic Identification—Radio Frequency Identification for Item Management—Communications and Interfaces—Part 3: Physical Layer, Anti-Collision System and Protocol Values at 13.56 MHz Mode 1", ISO/IEC, #ISO/WD 18000-3-v40-1, 102 pp. (Mar. 1, 2001).

Capetanakis, John I., "Tree Algorithms for Packet Broadcast Channels", *IEEE Transactions on Information Theory*, vol. IT-25, No. 5, pp. 505-515 (Sep. 1979).

EPC™ Radio Frequency identity Protocols Class-1 Generation-2 UHF RFID Protocol for Communications at 860 MHz-960MHz, *EPC Global, Inc.* Version 1.0.9, Cover Sheet and pp. 37-38 (Jan. 2005).

Wright, Jim, "Trends and Innovations in RF Identification", *SUN Microsystems, Inc.*, (presentation); 30 pp. (undated).

Whitepaper, "Understanding Gen 2: What It Is, How You Will Benefit and Criteria for Vendor Assessment", *Symbol Technologies, Inc.*, 8 pp. (Jan. 2006).

Capetanakis, John I., "Generalized TDMA: The Multi-Accessing Tree Protocol," *IEEE Transaction on Communications*, vol. Com 27, No. 10, pp. 1476-1484 (Oct. 1979).

Wolf, Jack Keil, "Principles of Group Testing and an Application to the Design and Analysis of Multi-Access Protocols," NATO ASI Series E, Applied Sciences, N. 91, pp. 237-257 (1985).

Humblet, Pierre A., et al., "Efficient Accessing of a Multiaccess Channel", *Proc IEEE Conference Decis Control Incl Symp Adapt Processes 1*, p. 624-627 (1980).

EP serial No. 05016514.1 ; Extended Search Report and Search Opinion; mailed Jan. 26, 2007; 5 pp.

EP serial No. 05016513.3 ; Extended Search Report And Search Opinion; mailed Jan. 22, 2007; 5 pp.

http://www.rfid-handbook.com/, "Radio Frequency-IDentific@tion; The Autors Homepage of the RFID Handbook", © 1998-2006, 2 pp. (reprinted Feb. 22, 2007).

http://www.sal-c.org/, Smart Active Labels (SAL) Consortium), © 2007, 1 page (reprinted Feb. 22, 2007).

U.S. Appl. No. 11/607,263, filed Dec. 1, 2006, John R. Tuttle.

Transaction History of related U.S. Appl. No. 09/026,043, filed Feb. 19, 1998, entitled "Method of Addressing Messages and Communications System," now U.S. Patent No. 6,118,789.

Transaction History of related U.S. Appl. No. 09/026,045, filed Feb. 19, 1998, entitled "Method of Addressing Messages, Methods of Establishing Wireless Communications, and Communications System," now U.S. Patent No. 6,072,801.

Transaction History of related U.S. Appl. No. 09/026,050, filed Feb. 19, 1998, entitled "Method of Addressing Messages and Communications System," now U.S. Patent No. 6,061,344.

Transaction History of related U.S. Appl. No. 09/026,248, filed Feb. 19, 1998, entitled "Method of Addressing Messages and Communications System," now U.S. Patent No. 6,275,476.

Transaction History of related U.S. Appl. No. 09/551,304, filed Apr. 18, 2000, entitled "Method of Addressing Messages and Communications Systems," now U.S. Patent No. 6,282,186.

Transaction History of related U.S. Appl. No. 09/556,235, filed Apr. 18, 2000, entitled "Method of Addressing Messages, and Establishing Communications Using a Tree Search Technique That Skips Levels," now U.S. Patent No. 6,226,300.

Transaction History of related U.S. Appl. No. 09/617,390, filed Jul. 17, 2000, entitled "Method of Addressing Messages and Communications System," now U.S. Patent No. 6,307,847.

Transaction History of related U.S. Appl. No. 09/773,461, filed Jan. 31, 2001, entitled "Method of Addressing Messages, Methods of Establishing Wireless Communications, and Communications System," now U.S. Patent No. 6,307,848.

Transaction History of related U.S. Appl. No. 09/820,467, filed Mar. 28, 2001, entitled "Method of Addressing Messages and Communications System," now U.S. Patent No. 7,315,522.

Transaction History of related Transaction History of related U.S. Appl. No. 10/652,573, filed Aug. 28, 2003, entitled "Method of Addressing Messages and Communications System."

Transaction History of related U.S. Appl. No. 10/693,696, filed Oct. 23, 2003, entitled "Method and Apparatus to Select Radio Frequency Identification Devices in Accordance with an Arbitration Scheme."

Transaction History of related U.S. Appl. No. 10/693,697, filed Oct. 23, 2003, entitled "Method of Addressing Messages, Methods of Establishing Wireless Communications, and Communications System."

Transaction History of related U.S. Appl. No. 11/143,395, filed Jun. 1, 2005, entitled "Method of Addressing Messages and Communications System."

Transaction History of related U.S. Appl. No. 11/270,204, filed Nov. 8, 2005, entitled "Method of Addressing Messages and Communications System."

Transaction History of related U.S. Appl. No. 11/416,846, filed May 2, 2006, entitled "Method of Addressing Messages and Communications System."

Transaction History of related U.S. Appl. No. 11/755,073, filed May 30, 2007, entitled "Methods and Systems of Receiving Data Payload of RFID Tags."

Transaction History of related U.S. Appl. No. 11/855,855, filed Sep. 14, 2007, entitled "Method of Addressing Messages and Communications System."

Transaction History of related U.S. Appl. No. 11/855,860, filed Sep. 14, 2007, entitled "Method of Addressing Messages and Communications System."

Transaction History of related U.S. Appl. No. 11/859,360, filed Sep. 21, 2007, entitled "Method of Addressing Messages and Communications System."

Transaction History of related U.S. Appl. No. 11/859,364, filed Sep. 21, 2007, entitled "Method of Addressing Messages and Communications System."

Transaction History of related U.S. Appl. No. 11/862,121, filed Sep. 26, 2007, entitled "Method of Addressing Messages and Communications System."

Transaction History of related U.S. Appl. No. 11/862,124, filed Sep. 26, 2007, entitled "Method of Addressing Messages and Communications."

Transaction History of related U.S. Appl. No. 11/862,130, filed Sep. 26, 2007, entitled "Method of Addressing Messages and Communications System."

Transaction History of related U.S. Appl. No. 11/865,580, filed Oct. 1, 2007, entitled "Method of Addressing Messages, Methods of Establishing Wireless Communications, and Communications System."

Transaction History of related U.S. Appl. No. 11/865,584, filed Oct. 1, 2007, entitled "Method of Addressing Messages, Methods of Establishing Wireless Communications, and Communications System."

PCT/US08/50630—International Search Report (mailed Jun. 27, 2008).

PCT/US08/50630—Written Opinion (mailed Jun. 27, 2008).

International Application No. PCT/US99/02288, Written Opinion, Jan. 27, 2000.

Wood, Jr., Clifton W., Reissue U.S. Appl. No. 10/652,573, filed Aug. 28, 2008.

Wood, Jr., Clifton W., Reissue U.S. Appl. No. 10/693,696, filed Oct. 23, 2003.

Wood, Jr., Clifton W., Reissue U.S. Appl. No. 10/693,697, filed Oct. 23, 2003.

Wood, Jr., Clifton W., Reissue U.S. Appl. No. 11/859,360, filed Sep. 21, 2007.

Wood, Jr., Clifton W., Reissue U.S. Appl. No. 11/859,364, filed Sep. 21, 2007.

Wood, Jr., Clifton W., Reissue U.S. Appl. No. 11/862,121, filed Sep. 26, 2007.

Wood, Jr., Clifton W., Reissue U.S. Appl. No. 11/862,124, filed Sep. 26, 2007.

Wood, Jr., Clifton W., Reissue U.S. Appl. No. 11/862,130, filed Sep. 21, 2007.

Wood, Jr., Clifton W., Reissue U.S. Appl. No. 11/865,580, filed Oct. 1, 2007.

Wood, Jr., Clifton W., Reissue U.S. Appl. No. 11/865,584, filed Oct. 1, 2007.

Tuttle, John R., U.S. Appl. No. 11/755,073 entitled "Methods and Systems of Receiving Data Payload of RFID Tags," filed May 30, 2007.

International Application No. PCT/US99/02288, International Search Report, Aug. 3, 1999.

Wood, Jr., Clifton W., Reissue U.S. Appl. No. 12/493,542, filed Jun. 29, 2009.

Wood, Jr., Clifton W., Reissue U.S. Appl. No. 12/541,882, filed Aug. 14, 2009.

\* cited by examiner

SYSTEMS AND METHODS FOR RFID TAG ARBITRATION WHERE RFID TAGS GENERATE MULTIPLE RANDOM NUMBERS FOR DIFFERENT ARBITRATION SESSIONS

TECHNICAL FIELD

The technical field relates to radio frequency identification. More particularly, various embodiments of the invention relate to methods and apparatus for inventorying radio frequency identification devices.

BACKGROUND

Radio frequency identification devices (RFIDs) are known in the art. Such devices are typically used for inventory tracking. As large numbers of objects are moved in inventory, product manufacturing, and merchandising operations, there is a continuous challenge to accurately monitor the location and flow of objects. Additionally, there is a continuing goal to determine the location of objects in an inexpensive and streamlined manner. One way to track objects is by affixing RFID tags to objects or groups of objects, and interrogating the RFID tags with an interrogator or reader to determine which objects are present in any particular location. RFID tags may be provided with unique identification numbers or codes in order to allow a reader to distinguish between multiple different tags.

Some RFID tags use the electromagnetic field from an interrogator for power. Typically, these devices are passive (have no power supply), which results in a small and portable package.

Another type of RFID tag is an active RFID tag, which includes its own source of power, such as a battery.

If an interrogator or reader has prior knowledge of the identification number of a device, the reader can specify that a response is requested only from the device with that identification number. Sometimes, such information is not available. For example, there are occasions where a reader is attempting to determine which of multiple devices are within communication range. When the reader sends a message to a transponder device requesting a reply, there is a possibility that multiple transponder devices will attempt to respond simultaneously, causing a collision, and thus an erroneous message to be received by the reader. For example, if the interrogator sends out a command requesting that all devices within a communications range identify themselves, and receives a large number of simultaneous replies, the interrogator may not able to interpret any of these replies. Tag responses can interfere with each other and the reader sees collisions or incomprehensible noise. Therefore, arbitration or singulation schemes are employed to permit communications that are free of collisions. The term singulation refers to identifying a specific individual tag in a multiple tag environment.

In some arbitration or singulation schemes, described in commonly assigned U.S. Pat. Nos. 5,627,544; 5,583,850; 5,500,650; and 5,365,551, all to Snodgrass et al. and the disclosures of all of which are incorporated herein by reference, a reader sends a command causing each device of a potentially large number of responding devices to select a random number from a known range and use it as that device's arbitration number. By transmitting requests for identification to various subsets of the full range of arbitration numbers, and checking for an error-free response, the interrogator quickly determines the arbitration number of every responder station capable of communicating at the same time. Thereafter, the interrogator is able to conduct subsequent uninterrupted communication with devices, one at a time, by addressing only one device. Various arbitration or singulation schemes are discussed in commonly assigned U.S. Pat. Nos. 6,275,476 to Wood, Jr.; 6,118,789 to Wood, Jr.; 6,072,801 to Wood, Jr. et al.; and 6,061,344 to Wood, Jr., the disclosures of all of which are incorporated herein by reference.

It is possible to have multiple readers operating in the same location. Problems can arise when multiple readers try to conduct an inventory at the same time.

EPCglobal is a standard setting organization that is developing standards for electronic product codes to support the use of RFID technology. One of their standards, called Class 1, Generation 2 (also known as "Gen 2") applies to passive RFID systems. These standards evolve over time, and for a particular standard, such as Gen 2, there are minor variations between versions. The present version of the Class 1, Generation 2 standard is version 1.0.9.

The various protocols are designed to arbitrate the collisions, and EPCglobal's Gen 2 provides a specific methodology for arbitrating the collisions. In some of the above described patents, a binary-tree approach is used, in which some unique identifier is assigned to each tag, Such as the electronic product code, and the reader goes down the tree of possible numbers, until it is confident that it is talking to just a single tag. At that point the tag is read, and put to sleep. The reader then goes back up the tree and tries to singulate another tag. This repeats until there are no more tags left responding.

The Gen 2 standard takes a different approach to generating an inventory. The approach used by the Gen 2 standard, has inventory rounds of $2^Q$ slots. Although the word "slot" is used in the specification, it is not really a timeslot. It is more of a counter. The process is illustrated in FIG. 1. At the beginning of each round, each tag sets its respective slot counter 10, 12, 14, 16, 18 to a random number, from 0 to $2^Q-1$. The reader sends a command that starts an inventory process. Any tag whose slot counter is 0 sends a reply; all other tags decrease their slot counter by 1. This process is repeated for all $2^Q$ slots. Q is the number of bits, or width of the slot counter. By changing Q, the reader can optimally adjust the number of slots per round to adapt to the number of tags expected to be present. For example, if it is known that there are no more than six tags in a field, there is no need to use a slot counter that is 16 bits wide when 3 bits are sufficient. Thus Q, of the Gen 2 standard, is effectively a mask on the slot counter. Q is similar to the width of the Arbitration Mask described in the above-incorporated Snodgrass and Wood, Jr. patents.

Thus, Q is a parameter that is used to regulate the probability of tag response. During an inventory round, the tags respond only when their slot counter equals zero. The slot counter contents are derived in a pseudorandom manner based on the value of the parameter Q. In the Gen 2 standard, Q is, for example, an integer between 0 and 15, and the number of slots is between $2^0$ and $2^{15}$.

The Gen 2 standard further allows the user to include in an inventory round only tags that meet certain selection criteria. Appropriate combinations of Select commands can be used to implement Boolean criteria within a tag population.

The Gen 2 standard has also implemented a method called "Sessions" to attempt to solve the problem of two, three or four readers reading the same population of tags in the same time period; i.e., an inventory processes overlap. According to the specification, a reader shall support and tags shall provide four sessions, and tags shall participate in one and only one session during an inventory round. Two or more interrogators can use sessions to independently inventory a common tag population. Tags associate a separate and independent "inventoried" flag to each of the multiple readers. After singulating a tag, an interrogator may issue a command that causes the tag to invert its inventoried flag for that session. However, all four sessions use the same random number generator and same slot counter. When a tag's arbitration procedure gets interrupted (when one sessions stops and another session starts), the tag has to start over in an arbitration with a new reader and has to generate a new slot counter and handle (RN16) value. When the slot counter gets to zero, the tag replies and may have been inventoried by the interrupting reader. But when the first reader tries to resume its inventorying, the tag has lost its original handle and the reader cannot find the tag. The first reader has to begin its inventory process all over again.

Relevant portions of the Gen 2 specification will now be substantially repeated, to better enable one of ordinary skill in the art to understand the Gen 2 arbitration procedure. According to the Gen 2 specification, the inventory commands that a Gen2 reader or interrogator use include a "Query" command, a "QueryAdjust" command (described below), a "QueryRep" command (described below), an "ACK" (acknowledge) command, and a "NAK" (no acknowledgement or not acknowledged) command or transmission. The Query command initiates an inventory round and decides which tags participate an inventory round. A round is a period between successive Query commands.

Also according to the Gen 2 specification, the Query command contains the slot-count parameter Q. Upon receiving a Query command, participating tags pick a random number in the range of 0 to $2^Q-1$, inclusive, and load this value into their slot counter. Tags that pick a zero transition to the reply state and reply immediately. Tags that pick a nonzero value transition to an "arbitrate" state (see FIG. 3) and await a QueryAdjust (described below) or a QueryRep command. Assuming a single tag replies, the following occurs: a) the tag backscatters an RN16 (16 bit random or pseudo random number) as it enters a reply state, b) the reader acknowledges the tag with an ACK COMMAND containing the same RN16, c) the acknowledged tag transitions to an "acknowledged" state, and backscatters its PC (protocol control data), EPC (electronic product code data that identifies the object to which the tag is or will be attached and distinguishes the tag from other tags) and CRC-16 (cyclic redundancy check), and d) the interrogator issues a QueryAdjust or QueryRep command (not shown), causing the identified tag to invert an "inventoried" flag (i.e., from A to B or B to A) and to transition to a "ready" state, and potentially causing another tag to initiate a query-response dialog with the interrogator, starting in step (a), above. The tag can be considered to be singulated after it is acknowledged.

If the tag fails to receive the ACK acknowledgement in step (b) within a specified time, or receives the ACK with an erroneous RN16, it returns to the arbitrate state. If multiple tags reply in step (a) above, but the reader is able to resolve an RN16 from one of the tags, the reader can acknowledge the resolved tag. Unresolved tags receive erroneous RN16s from the reader and return to the arbitrate state without backscattering their PC, EPC, and CRC-16.

If the reader sends a valid acknowledgement (i.e., an ACK containing the correct RN16) to the tag in the acknowledged state, the tag re-backscatters its PC, EPC, and CRC-16.

At any point the reader may issue a NAK. In response to receiving the NAK, all tags in the inventory round return to the arbitrate state without changing their inventoried flag.

After issuing a Query command to initiate an inventory round, the reader typically issues one or more QueryAdjust or QueryRep commands. The QueryAdjust repeats a previous Query and may increment or decrement Q, but does not introduce new tags into the round. QueryRep repeats a previous Query without changing any parameters and without introducing new tags into the round. An inventory round can contain multiple QueryAdjust or QueryRep commands. At some point the reader will issue a new Query, thereby starting a new inventory round.

Tags in the arbitrate or reply states that receive a QueryAdjust first adjust Q (increment, decrement, or leave unchanged), then pick a random value in the range of 0 to $2^Q-1$, inclusive, and load this random value into their slot counter. Tags that pick zero transition to the reply state and reply immediately. Tags that pick a nonzero value transition to the arbitrate state and await a QueryAdjust or a QueryRep command.

Tags in the arbitrate state decrement their slot counter every time they receive a QueryRep command, transitioning to the reply state and backscattering an RN16 when their slot counter reaches 0000 (hexadecimal). Tags whose slot counter reached 0000, who replied, and who were not acknowledged (including tags that responded to the original Query and were not acknowledged) return to the arbitrate state with a slot value of 0000 and decrement this slot value from 0000 to 7FFF (hexadecimal) at the next QueryRep, thereby effectively preventing subsequent replies until the tag loads a new random value into its slot counter. Tags reply at least once in $2^Q-1$ QueryRep commands.

Although tag inventory is based on a random protocol, the Q-parameter affords network control by allowing a reader to regulate the probability of tag responses. Q is an integer in the range of (0,15) thus, the associated tag-response probabilities range from $2^0=1$ to $2^{-15}=0.000031$.

To illustrate an inventory operation, the Gen 2 specification provides the following specific example. Assume a population of sixty-four powered tags in the ready state. A reader first issues a Select command to select a subpopulation of tags. Assume that sixteen tags match the selection criteria. Further, assume that twelve of the sixteen selected tags each have their inventoried flag set to A in session S0. The reader issues a Query specifying (SL, Q=4, S0, A). Each of the 12 tags having their inventoried flag set to A picks a random number in the range of (0,15) and loads the value into its slot counter. Tags that pick a zero respond immediately. The Query has three possible outcomes:

a) No tags reply. The reader may issue another Query, or it may issue a QueryAdjust or QueryRep.

b) One tag replies. See FIG. 2. The tag transitions to the reply state and backscatters 20 an RN16. The reader acknowledges the tag by sending 22 an ACK. If the tag receives the ACK with a correct RN16, it backscatters 24 its PC, EPC, and CRC-16 and transitions to the acknowledged state. If the tag receives the ACK with an incorrect RN16, it transitions to arbitrate. Assuming a successful ACK, the reader may either access the acknowledged tag or issue 26 a QueryAdjust or QueryRep to invert the tag's inventoried flag from A to B and send the tag to the ready state. A Query with a matching prior-round session parameter will also invert the inventoried flag from A to B.

c) Multiple tags reply. The reader observes a backscattered waveform comprising multiple RN16s. It may try to resolve the collision and issue an ACK; not resolve the collision and issue a QueryAdjust, QueryRep, or NAK; or quickly identify the collision and issue a QueryAdjust or QueryRep before the collided tags have finished backscattering. In the latter case, the collided tags, not observing a valid reply within the specified time, return to the arbitrate state and await the next Query of QueryAdjust command. The Gen 2 arbitration process is also described in connection with a tag state diagram included in the Gen 2 specification, a relevant portion of which is reproduced as FIG. 3. Arbitrate state 30, reply state 32, and acknowledged state 34 correspond to such states as discussed above. FIG. 3 also shows that the term "handle," as used in the Gen 2 specification, corresponds to an RN16 that a reader uses as a nickname for a tag after a tag has a zero slot value and is acknowledged. Additional details, if desired, can be seen in the Gen 2 specification.

Instead of asking for a tag with a specific masked random number as described in the above incorporated Snodgrass and Wood, Jr. patents (and the reader subsequently going up or down through all numbers in the masked random number space, e.g., using the logic trees of the Wood, Jr. patents), the slot counters of tags based on the Gen 2 specification count down toward 0 in response to receiving each QueryRep command. When a tag slot counter reaches 0, the tag generates a new random number and returns it to the reader, and this is used as a temporary tag number or "handle" by the reader. The Gen 2 handle is substantially similar to the Random Number of the Snodgrass and Wood, Jr. patents. The Gen 2 process is substantially similar to the Snodgrass and Wood Jr. processes except that the Gen 2 tags make the countdown steps and issue new and large random numbers. This requires significantly more complexity in the tags, where real estate is expensive, instead of in the readers.

A conventional RFID tag 36, shown in FIG. 4, has one random number generator 38, one location 40 for storing random numbers, and one mask or Q value storage location 42. There is a problem when a second reader 44 initiates an arbitration process concurrent with the arbitration process of a first reader 46. The second reader 44, while it may have a different session number, must command tags to each generate a new random number and mask. The new random numbers and new masks may differ in value from those generated for the first reader arbitration. Since each tag 36 stores only one random number and one mask or Q value, the first random number and mask are lost to the tags and unavailable to the first reader 46 for use upon continuing (resuming) after a second reader's arbitration process. The first reader 46 must send commands for its tag population to generate new random numbers and perhaps different masks (Q values), both of which can lead to prolonged inventory times. The problem is exacerbated if an additional reader 48 is introduced. In some cases, the inventory processes may never finish. In other words, the EPCglobal system does not truly provide multiple concurrent inventorying, even for two sessions, let alone four.

More particularly, using conventional tags in multiple concurrent arbitrations will result in extra sortings of tags. This is because, when a second reader starts its sort, the second reader's command will cause the tags to generate new random numbers and Q values that are, at that point, lost to the first reader's sorting process. This causes the first reader to ask for a new random number that is masked to the first Q value. The first (interrupted) sorting addressing sequence is lost and must be restarted upon resuming. In the case of multiple interruptions and restarts, the arbitration process of any reader may in some cases be extended indefinitely and not converge to a conclusion.

DETAILED DESCRIPTION OF THE ILLUSTRATED EMBODIMENTS

Some embodiments of the invention relate to increasing the efficiency of multiple concurrent arbitration of an RFID tag population. Some embodiments of the invention relate to improving re-entry into an interrupted inventory session.

Some embodiments provide a method to enhance RFID tag arbitration which utilizes a random number generator (RNG), RNG register, RNG mask (Q value), and mask register, for each of a multiplicity of concurrent tag arbitration processes; thereby increasing the efficiency and effectiveness of each individual arbitration process and overall arbitration processes for inventorying multiple concurrent tag populations, while preventing the case of infinite loop non-convergence of the processes.

Figure 1:
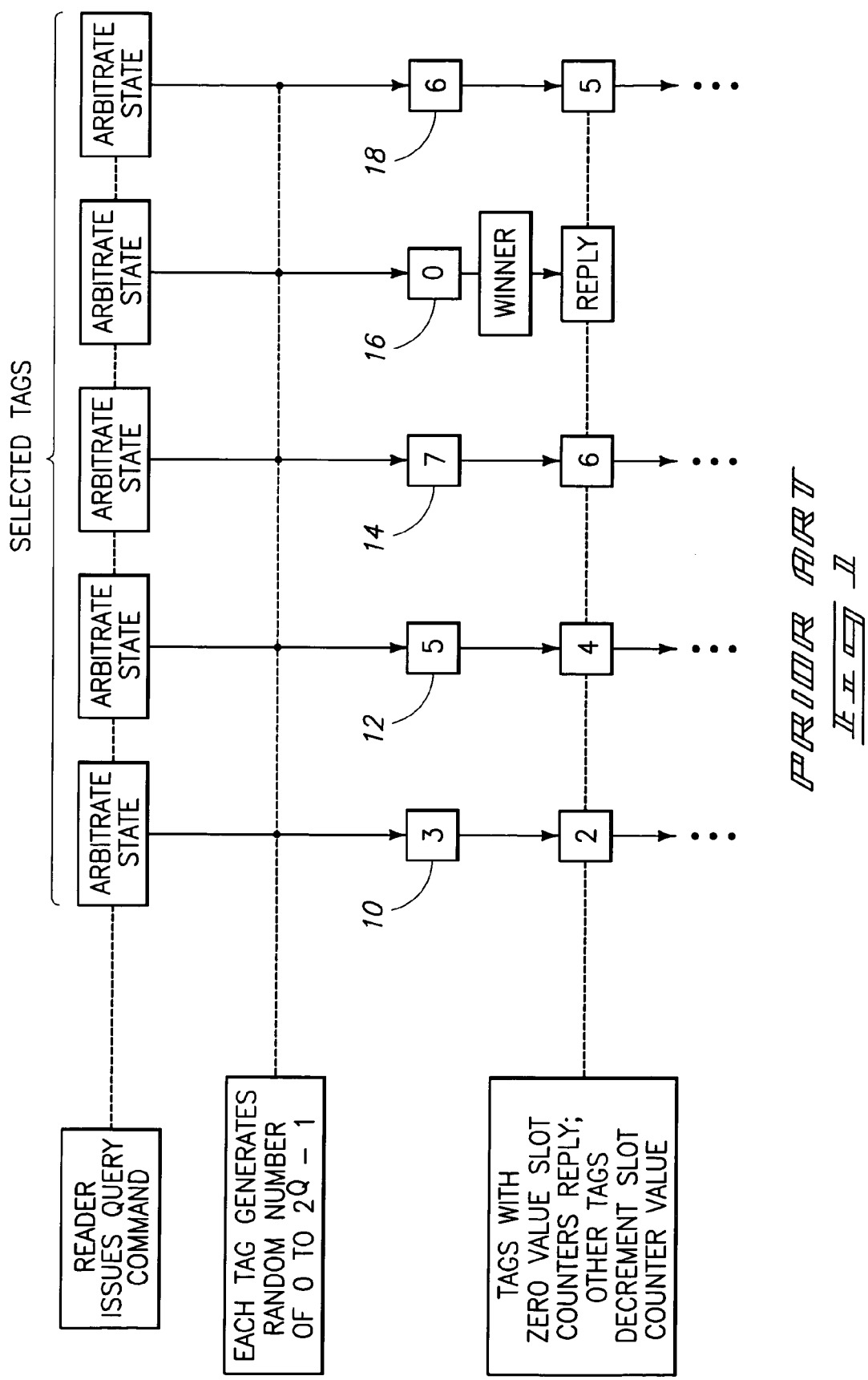
FIG. 1 is a timing diagram illustrating an inventory operation and slot counter operation in accordance with the EPCglobal method.
Figure 2:
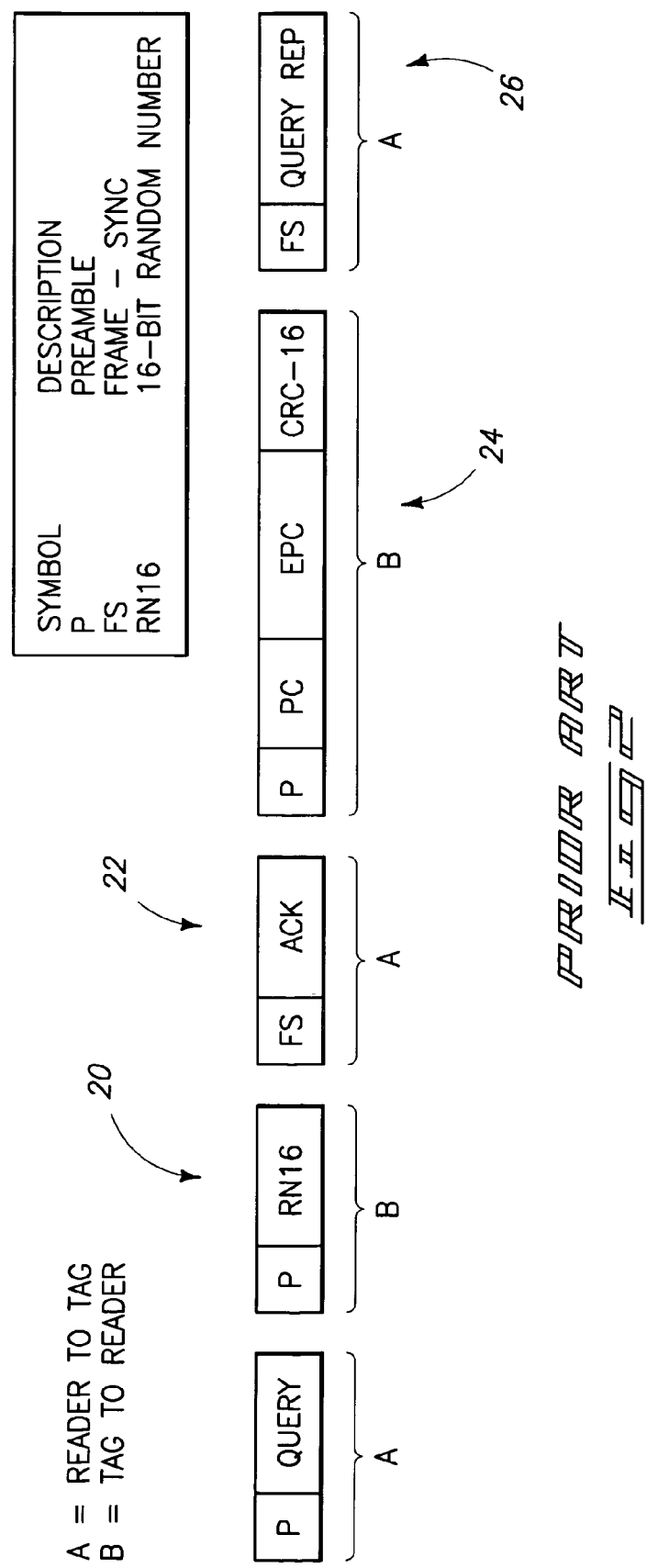
FIG. 2 is a communication sequence diagram illustrating data communications between a tag and a reader if a single tag picks a zero value for its slot counter.
Figure 3:
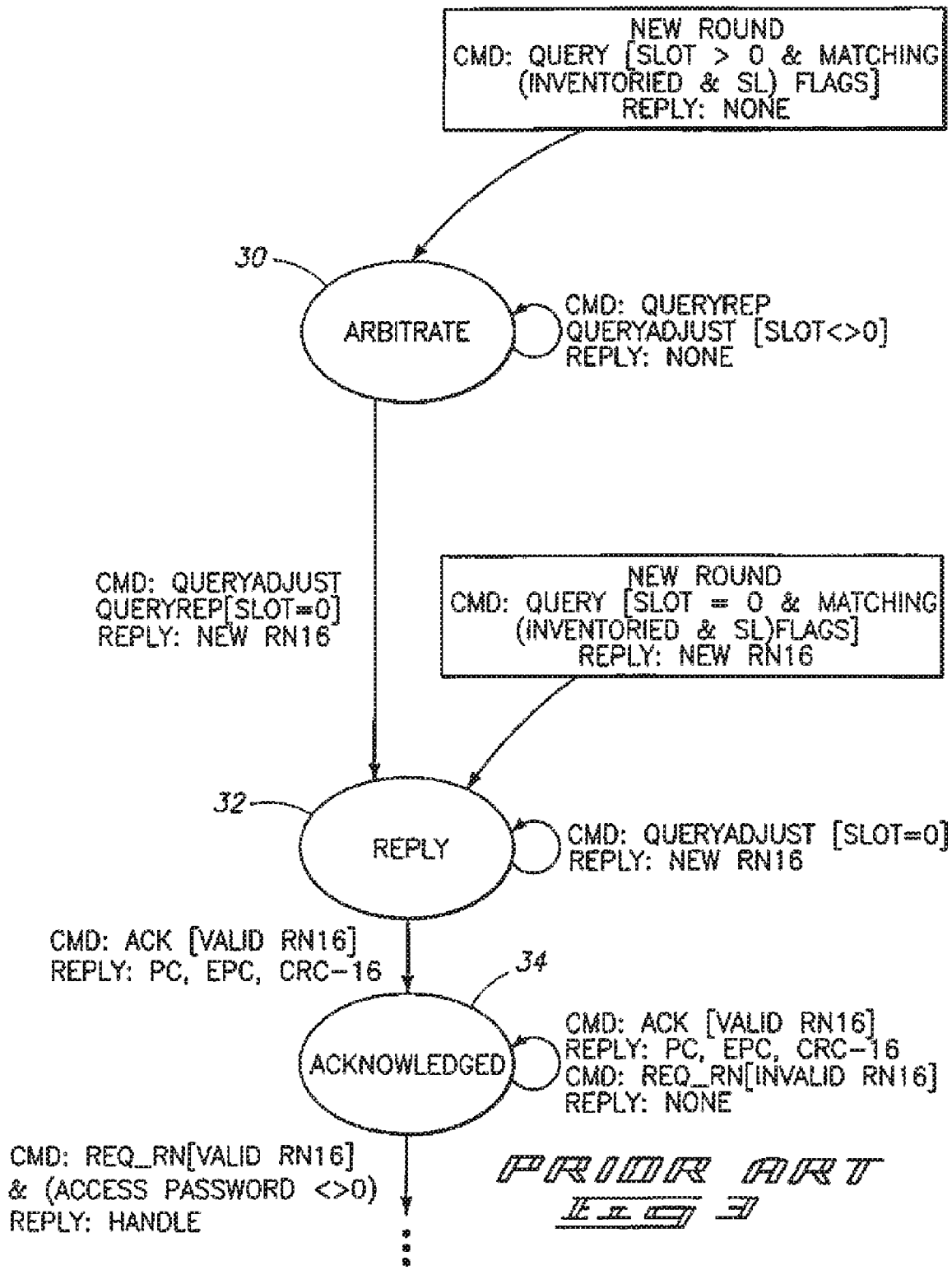
FIG. 3 is a state diagram illustrating states that a tag may go through as part of an arbitration process.
Figure 4:
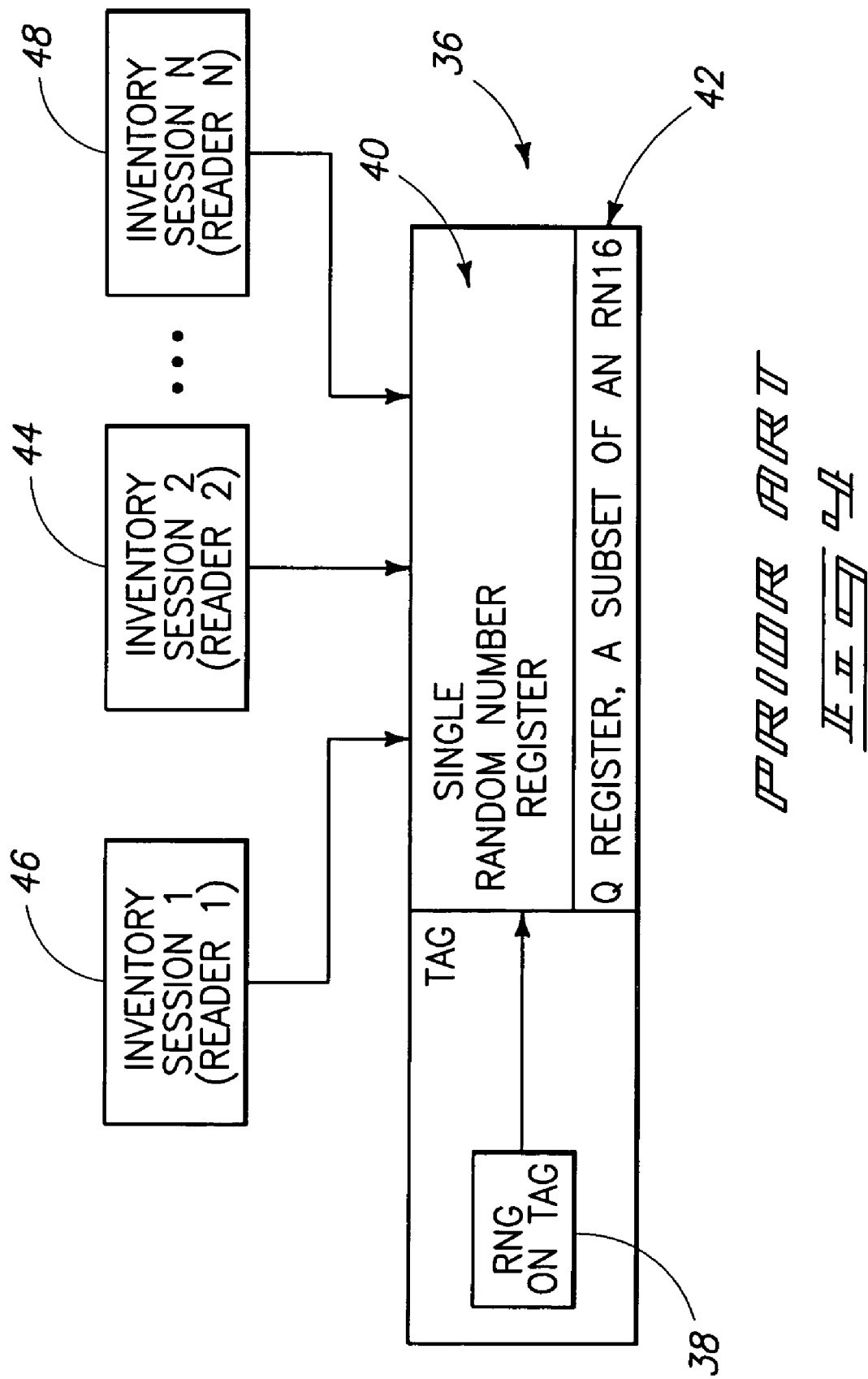
FIG. 4 is a block diagram illustrating problems with prior art designs.
Figure 5:
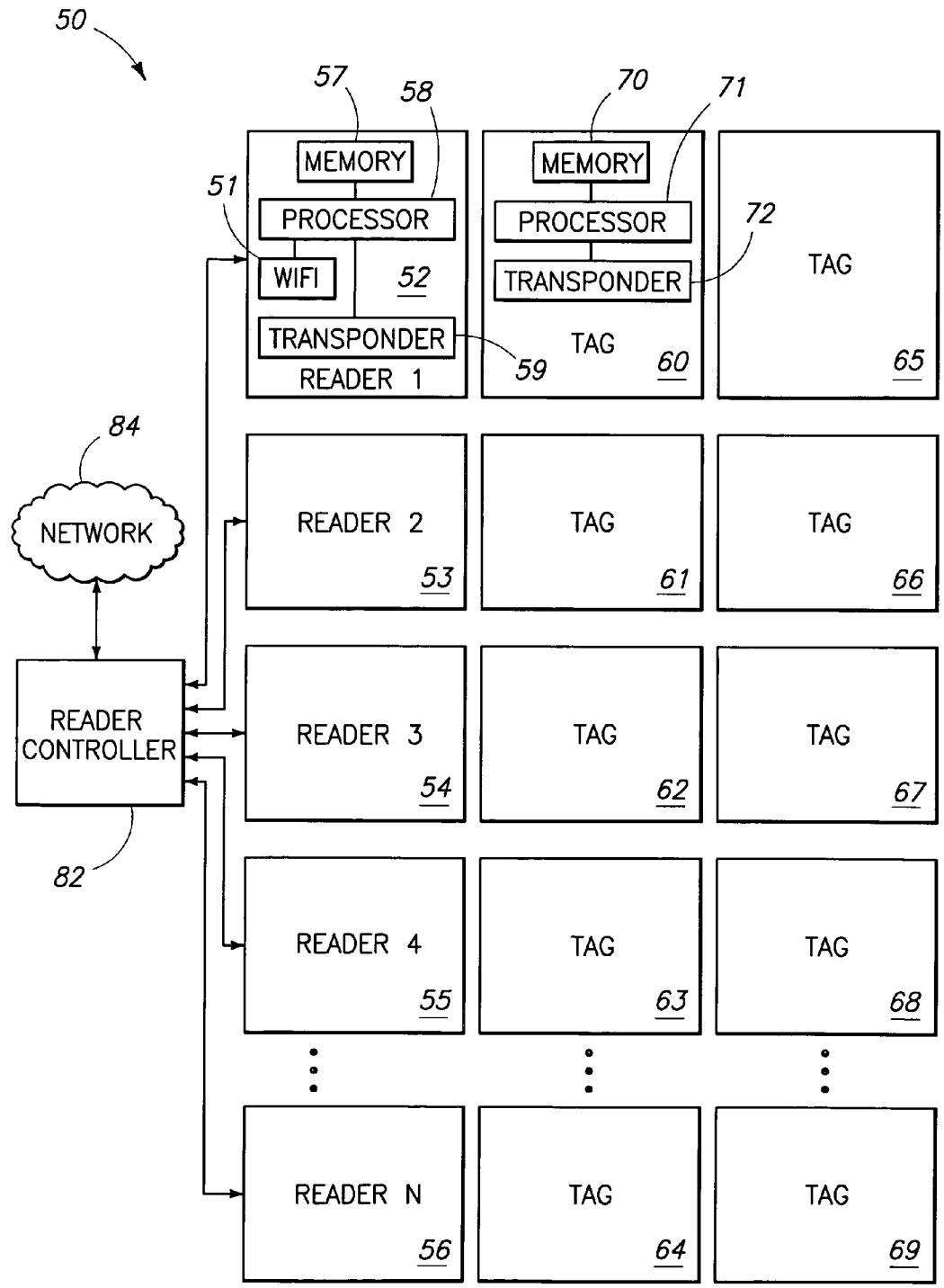
FIG. 5 is a block diagram illustrating a system in accordance with various embodiments of the invention.

FIG. 5 shows a system 50 in accordance with some embodiments of the invention. The system 50 includes one or more tags and one or more readers. More particularly, in the embodiment shown in FIG. 5, the system 50 includes readers 52, 53, 54, 55, and 56, and tags 60, 61, 62, 63, 64, 65, 66, 67, 68, and 69. Additional or fewer or readers can be included. Additional or fewer tags could be included. Further, there is no necessary relationship between the number of tags and the number of readers.

In some embodiments, the system 50 includes a reader controller 82 controlling the readers 52-56. The reader controller 82 permits control of the various readers as well as communication of data between the various readers. The reader controller 82 can further be used for reader multiplexing as described in applicant's commonly assigned patent application titled "RFID Communications Systems and Methods, And RFID Readers and Systems" by John Tuttle. In some embodiments, the reader controller 82 may be coupled to a network 84. This could be useful for control from a remote location or via the Internet, for example. In some embodiments, the readers 52-56 may communicate with each other directly (or via an intermediate reader), instead of through a reader controller 82, whether or not the reader controller 82 is included. For example, the readers may be connected by hard wire or wirelessly (e.g., by Wi-Fi or other wireless communication). In some embodiments, the reader other embodiments, the reader controller 82 is omitted.

Respective tags 60-69 include memory 70, a processor 71, and a transponder or transceiver 72 (e.g., including a backscatter modulator). In some embodiments, one or more of the tags include all of the hardware required by the Gen 2 specification. In other embodiments, one or more of the tags include some subset of the hardware required by the Gen 2 specification.

Respective readers 52-56 include memory 57, a processor 58, and a transponder or transceiver 59 for communications with tags 60-69. The readers may also include a Wi-Fi or other wireless transceiver 51 for wireless communications with other readers, in addition to the transponder 59.

Figure 6:
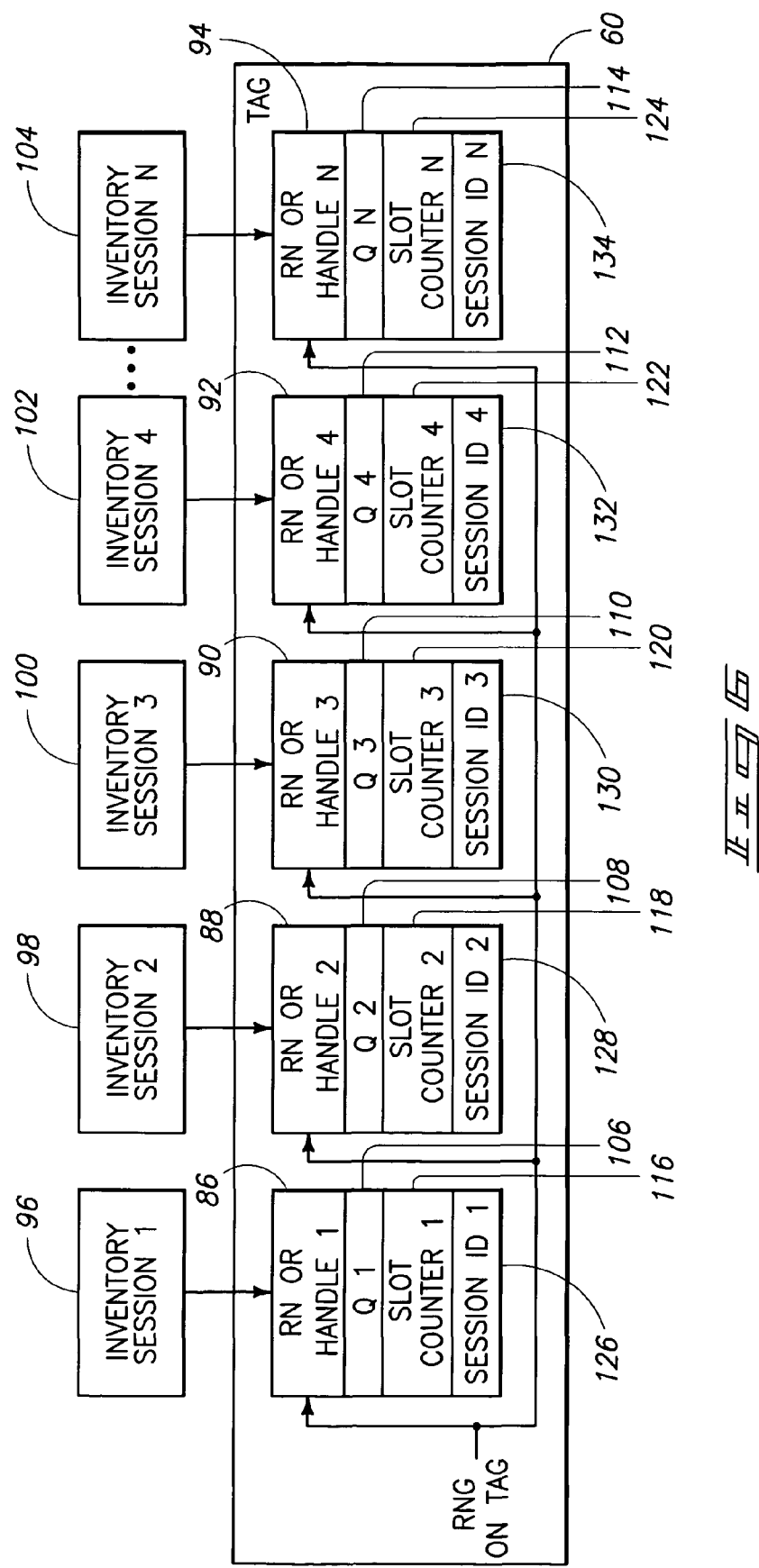
FIG. 6 is a block diagram illustrating data stored in a tag of the system of FIG. 5, for multiple inventory sessions, in some embodiments.

FIG. 6 shows data stored in respective tags 60-69, in some embodiments. One tag 60 is illustrated in FIG. 6, for simplicity. The data can be stored in the memory 70, for example (see FIG. 5).

Some embodiments provide, in respective tags 60-69, separate memory locations for random number or handle values 86, 88, 90, 92, and 94 for each arbitration or singulation process 96, 98, 100, 102, and 104. These correspond, for example, to the RN16s of Gen 2, though they may have more or less than 16 bits. The random numbers or handles may be stored in any appropriate register or memory location on the tags. The random number or handle values may change and are affected by commands from a reader, as specified in the Gen 2 specifications for example. However, the last used (most recent) random number or handle values for each inventory session is stored in each tag Some embodiments provide, in respective tags 60-69, separate memory locations for Q values or arbitration mask values 106, 108, 110, 112, and 114 for each arbitration or singulation process 96, 98, 100, 102, and 104. The Q value indicates the width, in number of bits, of the slot counter, in some embodiments. The Q value or mask may be stored in any appropriate register or memory location on the tags. The Q values may change and are affected by commands from a reader, as specified in the Gen 2 specifications for example. However the last used (most recent) Q value or arbitration mask for each inventory session 96, 98, 100, 102, and 104 is stored in each tag.

Some embodiments provide, in respective tags 60-69, separate slot counters 16, 118, 120, 122, and 124 for respective arbitrations. Respective tags are configured to reply to a reader if the value in a slot counter associated with a current or active arbitration is zero. The slot values are selected at random and are decremented in response to QueryAdjust or QueryRep commands, as set forth in the Gen 2 specification.

In some embodiments, respective tags 60-69 also store information, in memory locations 126, 128, 130, 132, and 134, identifying the session or reader associated with the stored last slot counter, last Q value, and last random number value or handle for a session.

The inventory sessions 96, 98, 100, 102, and 104 would typically represent different readers 52-56. However, it is possible for a second reader to complete an interrupted inventory session of a first reader if data from a first inventory session is passed on to the second reader either directly from the first reader or from the reader controller 82.

Figure 7:
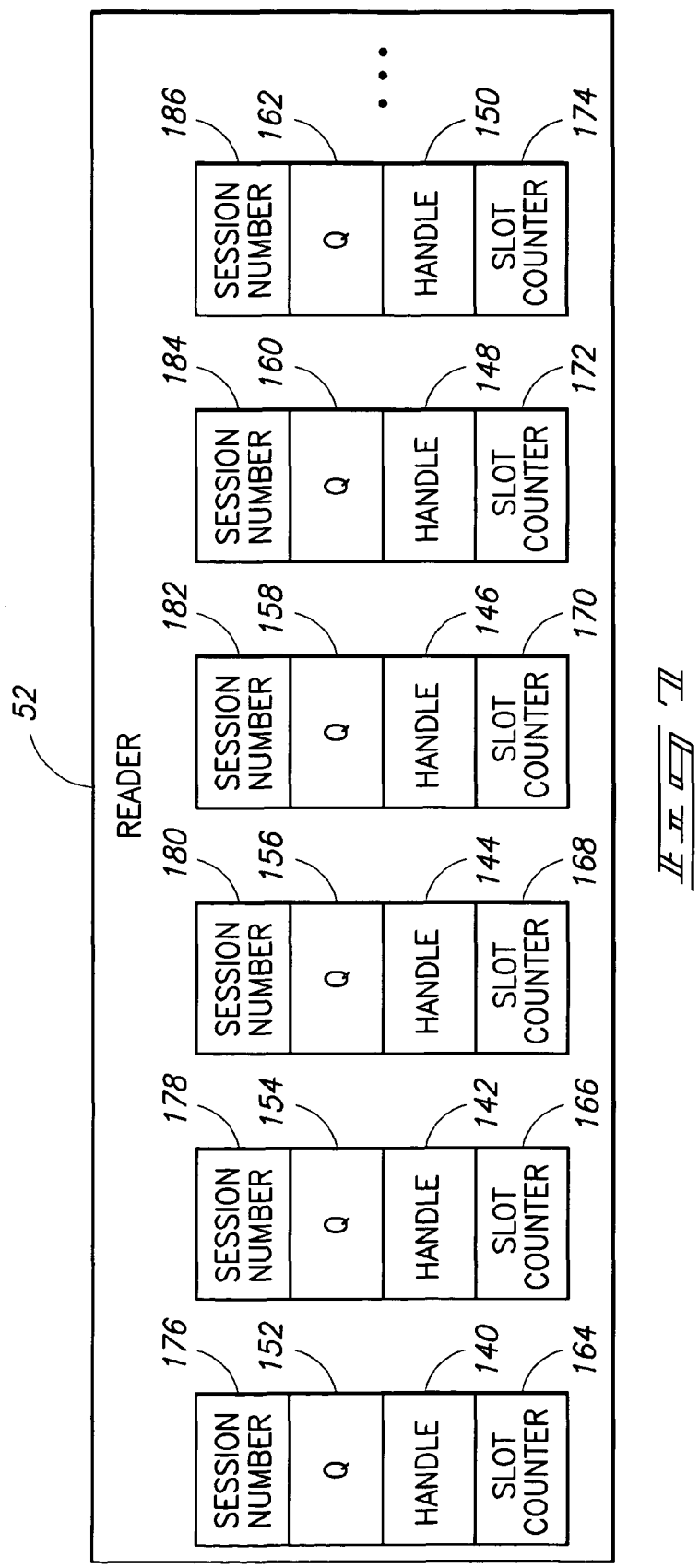
FIG. 7 is a block diagram illustrating data stored in a reader of the system of FIG. 5, in some embodiments.

FIG. 7 shows data stored in respective readers 52-56, in some embodiments. One reader 52 is illustrated in FIG. 7, for simplicity. The data can be stored in the memory 57, for example (see FIG. 5). The data shown in FIG. 7 and described below can alternatively or additionally be stored in the reader controller 82. Further, the data for one reader's arbitration can also be passed to and stored in another reader.

In the embodiment shown in FIG. 7, the respective readers 52-56 store information, in memory locations 140, 142, 144, 146, 148, and 150, for handles for previously singulated tags, the handle being a nickname for a tag and being different from the tag's electronic product code. The handle corresponds, for example, to the RN16 of the Gen 2 specification, though more or less than 16 bits are possible. If an arbitration is interrupted, the reader is able to resume the arbitration without a need to cause singulated tags to generate new handles, even if another reader performs another arbitration session and causes tags to generate handles. This is because handles for previous arbitrations are stored and not lost due to a new arbitration process.

In some embodiments, the readers 52-56 also store information, in memory locations 152, 154, 156, 158, 160, and 162 for last used Q values or arbitration masks for respective arbitrations. In some embodiments, no Q value is used or stored in the reader or tags. For example, a Q value of all 1 bits could be assumed, resulting in no masking taking place.

Some embodiments provide, in respective readers 52-56, memory locations 164, 166, 168, 170, 172, and 174 for slot counter values for previously singulated tags. The slot counter values are used to affect the order in which tags attempt to communicate with a reader in an arbitration. When slot counter values reach zero, a tag responds to a reader in an active arbitration, as described above.

Some embodiments provide, in respective readers 52-56, memory locations 176, 178, 180, 182, 184, and 186 for session number identifying an (e.g., interrupted) arbitration. Q values, handles, and slot counter values for tags that were singulated in an arbitration session are associated with the session number for that session.

This session number, Q value, handle, and slot counter data could be stored in arrays or matrices, in some embodiments.

In some embodiments, session number information, and last Q and last RN16 (Handle) information read from a tag for a given session is stored in a reader (or in the reader controller), and the reader is configured to selectively issue a command to resume a session. The command may be, for example, RESUME SESSION X, where X is a session number. The command passes session number, last Q and last Handle parameters from the reader to the tag from which those parameters were last read by the reader. The reader may then resume the inventory session that got interrupted.

In some embodiments, as is the case with the Gen 2 standard, the tags and readers have inventory rounds of $2^Q$ slots. At the beginning of each round every selected tag sets one of their slot counters, associated with an inventorying, to a random number from 0 to $2^Q-1$.

As is the case with the Gen 2 standard, a user is able to include in an inventory round only tags that meet certain selection criteria. Appropriate combinations of Select commands can be used to implement Boolean criteria within a tag population. This is why the term "selected" is used in the previous paragraph.

In operation, the reader sends a command that starts a slot. Any tag whose slot counter, for the present inventorying, is 0 sends a reply; all other tags decrease their slot counter by 1. This process is repeated in response to QueryRep commands. Q is the number of bits, or width of the slot counters.

In some embodiments, Q is, for example, an integer between 0 and 15, and the number of slots is between $2^0$ and $2^{15}$. In other embodiments, Q values indicating a wider width of the slot counters can be used As is the case in the Gen 2 specification, the tags support multiple sessions. Readers can use different sessions to independently inventory a common tag population. Tags associate a separate and independent "inventoried" flag to each of several readers. After singulating a tag, a reader may issue a command that causes the tag to invert its inventoried flag for that session. Unlike in the Gen 2 specification, tags may be inventoried by more than four readers or more than four sessions. A reader controller 82 may pass inventory session data from a first reader to a second reader, enabling a second reader to resume any session begun by a first reader. Such second reader may be multiplexed to a first reader's antenna(s) under control of reader controller 82.

While the above discussion has been in terms of an improvement to the Gen 2 system and process, it will be readily apparent that the same concepts can be used to improve the Snodgrass and Wood, Jr. processes. For example, the Gen 2 handle or RN16 is substantially similar to the Random Number of the Snodgrass and Wood, Jr. patents. The Gen 2 Q parameter is substantially similar to the width of the Arbitration Mask of the Snodgrass and Wood, Jr. patents. Thus, in some embodiments, the system and process of any of the Snodgrass and Wood, Jr. patents is modified by adding storing a plurality of separate Arbitration Mask and Random Number values for multiple simultaneous arbitrations.

Thus, a system and method has been provided to increase the efficiency and effectiveness of each individual arbitration process and overall arbitration processes for inventorying multiple concurrent tag populations, while preventing the case of infinite loop non-convergence of the processes.

In compliance with the statute, the subject matter disclosed herein has been described in language more or less specific as to structural and methodical features. It is to be understood, however, that the claims are not limited to the specific features shown and described, since the means herein disclosed comprise example embodiments. The claims are thus to be afforded full scope as literally worded, and to be appropriately interpreted in accordance with the doctrine of equivalents.

I claim:

1. An RFID (radio frequency identification device) tag comprising:
   a processor;
   a memory configured to store an identification number that distinguishes the tag from other tags;
   a transponder coupled to the memory and the processor, the tag being configured to arbitrate by selecting a random number, in response to an inventory query from a reader, and to respond to the reader depending on the random number selected, the tag being further configured for multiple concurrent inventory session arbitrations with multiple readers by separately storing random numbers for respective inventory session arbitrations.

2. An RFID tag in accordance with claim 1 wherein the random numbers are stored in slot counters in the memory, wherein the tag includes separate slot counters for respective inventory session arbitrations, and wherein the tag is configured to reply to a reader if the value in a slot counter associated with an arbitration is zero.

3. An RFID tag in accordance with claim 2 wherein the slot counter is decremented in response to a command from a reader if the tag is in an arbitration with the reader.

4. An RFID tag in accordance with claim 1 and configured to store a plurality of Q values in the memory, where Q represents the size of a slot counter, wherein respective Q values are stored for respective inventory session arbitrations.

5. An RFID tag in accordance with claim 1 and configured to store a plurality of session values in the memory, identifying which reader is attempting to inventory the tag, wherein respective session values are stored for respective inventory session arbitrations.

6. An RFID tag in accordance with claim 1 and configured to store a plurality of RN values in the memory, which are random numbers used by respective readers as handles, wherein respective RN values are stored for respective inventory session arbitrations.

7. An RFID tag in accordance with claim 1 wherein the transponder is a backscatter transponder.

8. An RFID reader configured to use arbitration to singulate unknown radio frequency identification tags in a field, different tags having different electronic product codes, the RFID reader comprising:
   a transponder;
   a processor; and
   a memory configured to store, for respective inventory session arbitrations, handles for previously singulated tags, each handle being a nickname for a tag and being different from the tag's electronic product code, wherein, if an arbitration is interrupted, the reader is able to resume the arbitration without a need to cause singulated tags to generate new handles, even if another reader performs another arbitration session and causes tags to generate handles.

9. An RFID reader in accordance with claim 8 wherein the memory is configured to store last used Q values for respective inventory session arbitrations, where Q represents the size of a slot counter.

10. An RFID reader in accordance with claim 8 wherein the memory is configured to store last used arbitration mask values for respective inventory session arbitrations.

11. An RFID reader in accordance with claim 8 wherein the memory is configured to store slot counter values for previously singulated tags, wherein slot counter values are used to affect the order in which tags attempt to communicate with a reader in an arbitration.

12. An RFID reader in accordance with claim 9 wherein the memory is configured to store slot counter values for previously singulated tags, wherein slot counter values are used to affect the order in which tags attempt to communicate with a reader in an arbitration.

13. An RFID reader in accordance with claim 12 wherein the memory is configured to store a session number identifying an interrupted arbitration, and to associate stored Q values, handles, and slot counter values with the session number.

14. An RFID reader in accordance with claim 8 wherein the memory is configured to store session numbers identifying interrupted inventory session arbitrations, and to associate handles with the session numbers.

15. A system comprising:
   a plurality of RFID tags, each of the RFID tags including:
      a processor;
      a memory configured to store an identification number that distinguishes the tag from other tags; and
      a transponder coupled to the memory and the processor, the tag being configured to arbitrate by selecting a random number, in response to an inventory query from a reader, and to respond to the reader depending on the random number selected, the tag being further configured for multiple concurrent inventory session arbitrations with multiple readers by separately storing random numbers for respective inventory session arbitrations; and
   a plurality of RFID readers configured to use arbitration to singulate radio frequency identification tags, each of the RFID readers including:
      a transponder;
      a processor; and
      a memory configured to store, for respective arbitration sessions, handles for singulated tags, the handles being nicknames for tags and being different from a tag's identification number, wherein, if an arbitration is interrupted for one of the readers, that reader is able to resume and continue the arbitration without a need to cause singulated tags to generate new handles, even if another of the readers performs another arbitration and causes tags to generate handles.

16. A system in accordance with claim 15 wherein the random numbers are stored in slot counters, wherein the tags respectively include multiple slot counters, and wherein the tags are configured to reply to a reader if the value in a slot counter becomes zero during an arbitration.

17. A system in accordance with claim 16 wherein the slot counters are decremented in response to a predetermined command from one of the readers for tags in an arbitration session with that reader.

18. A system in accordance with claim 15 wherein respective RFID tags are configured to store a plurality of Q values, where Q represents the size of a slot counter, wherein respective Q values are stored for respective inventory session arbitrations.

19. A system in accordance with claim 15 wherein respective RFID tags are configured to store a plurality of session values, identifying which reader is attempting to inventory the tag wherein respective session values are stored for respective inventory session arbitrations.

20. A system in accordance with claim 15 wherein respective RFID tags are configured to store a plurality of RN values, which are random numbers used by respective readers as handles, wherein respective RN values are stored for respective inventory session arbitrations.

21. A system in accordance with claim 15 wherein the transponder of respective tags is a backscatter transponder.

22. A system in accordance with claim 15 wherein the respective readers are configured to store last used Q values for respective inventory session arbitrations, where Q represents the size of a slot counter.

23. A system in accordance with claim 18 wherein the respective readers are configured to store last used Q values for respective inventory session arbitrations.

24. A system in accordance with claim 15 wherein the respective readers are configured to store last used arbitration mask values for respective inventory session arbitrations.

25. A system in accordance with claim 15 wherein the respective readers are configured to store slot counter values for previously singulated tags, wherein slot counter values are used to affect the order in which tags attempt to communicate with a reader in an arbitration.

26. A system in accordance with claim 16 wherein the respective readers are configured to store slot counter values for previously singulated tags, wherein slot counter values are used to affect the order in which tags attempt to communicate with a reader in an arbitration.

27. A system in accordance with claim 23 wherein respective readers are configured to store slot counter values for previously singulated tags, wherein slot counter values are used to affect the order in which tags attempt to communicate with a reader in an arbitration.

28. A system in accordance with claim 15 wherein respective readers are configured to store a session number identifying an interrupted arbitration, and to associate stored Q values, handles, and slot counter values with the session number.

29. A system in accordance with claim 15 wherein respective readers are configured to store session numbers identifying interrupted inventory session arbitrations, and to associate handles with the session numbers.

30. A system in accordance with claim 15 and further comprising a reader controller coupled to at least some of the readers and configured to control those readers.

31. A system comprising:
a plurality of RFID tags, each of the RFID tags including:
a processor;
a memory configured to store an identification number that distinguishes the tag from other tags; and
a transponder coupled to the memory and the processor, the tags being configured to arbitrate by selecting a random number, in response to an inventory query from a reader, and to respond to the reader depending on the random number selected, the tags being further configured to separately storing random numbers for respective inventory session arbitrations; and
a plurality of RFID readers configured to use arbitration to singulate radio frequency identification tags, each of the RFID readers including:
a transponder;
a processor; and
a memory configured to store, for respective arbitration sessions, handles for singulated tags, the handles being nicknames for tags and being different from a tag's identification number, wherein, if an arbitration is interrupted for one of the readers, that reader is able to resume and continue the arbitration without a need to cause singulated tags to generate new handles, even if another of the readers performs another arbitration and causes tags to generate handles, wherein a second one of the readers is configured to selectively complete an arbitration started by a first one of the readers in response to having information from the inventory started by the first reader passed to the second reader.

32. A system in accordance with claim 31 and further comprising a reader controller coupled to at least some of the readers and configured to pass the information from the inventory started by the first reader to the second reader.

33. A system in accordance with claim 31 wherein the random numbers are stored in slot counters, wherein the tags respectively include multiple slot counters, and wherein the tags are configured to reply to a reader if the value in a slot counter becomes zero during an arbitration.

34. A system in accordance with claim 33 wherein respective RFID tags are configured to store a plurality of Q values, where Q represents the size of a slot counter, wherein respective Q values are stored for respective inventory session arbitrations.

35. A system in accordance with claim 34 wherein respective RFID tags are configured to store a plurality of session values, identifying which reader is attempting to inventory the tag wherein respective session values are stored for respective inventory session arbitrations.

36. A system in accordance with claim 35 wherein respective RFID tags are configured to store a plurality of RN values, which are random numbers used by respective readers as handles, wherein respective RN values are stored for respective inventory session arbitrations.

37. A system in accordance with claim 36 wherein the respective readers are configured to store last used Q values for respective inventory session arbitrations.

38. A system in accordance with claim 37 wherein the respective readers are configured to store last used arbitration mask values for respective inventory session arbitrations.

39. A system in accordance with claim 38 wherein the respective readers are configured to store slot counter values for previously singulated tags, wherein slot counter values are used to affect the order in which tags attempt to communicate with a reader in an arbitration.

40. A system in accordance with claim 39 wherein respective readers are configured to store a session number identifying an interrupted arbitration, and to associate stored Q values, handles, and slot counter values with the session number.

41. A method comprising:
   beginning a first RFID inventory session, using a first RFID reader, the first RFID reader being configured to store random numbers for tags that have been singulated;
   interrupting the first RFID inventory session;
   beginning a second RFID inventory session using a second RFID reader, and causing RFID tags to generate new random numbers for the second RFID inventory session, the RFID tags being configured to store the random numbers from the first inventory session during the second RFID inventory session; and
   resuming the first RFID inventory session by the first RFID reader using the stored random number from the first RFID inventory session.

42. A method in accordance with claim 41 wherein the first RFID reader is further configured to store arbitration mask information from the first inventory session, and to keep that information during the second inventory session.

43. A method in accordance with claim 42 wherein the first RFID reader is further configured to store session counter information for tags that were singulated during the first inventory session, and to keep that information during the second inventory session.

44. A method in accordance with claim 43 wherein RFID tags are configured to store information for multiple inventory session arbitrations.

45. A method comprising:
   providing a plurality of RFID tags, each of the RFID tags including a processor; a memory configured to store an identification number that distinguishes the tag from other tags; and a transponder coupled to the memory and the processor, the tag being configured to arbitrate by selecting a random number, in response to an inventory query from a reader, and to respond to the reader depending on the random number selected, the tags being further configured to separately store random numbers for respective inventory session arbitrations;
   providing a plurality of RFID readers configured to use arbitration to singulate radio frequency identification tags, each of RFID readers including a transponder; a processor; and a memory configured to store, for respective arbitration sessions, handles for singulated tags, the handles being nicknames for tags and being different from a tag's identification number;
   interrupting an arbitration for a first one of the readers by a second one of the RFID readers; and
   resuming and continuing the arbitration for the first one of the readers using the stored handles without a need to cause singulated tags to generate new handles.

46. A method in accordance with claim 45 and comprising storing the random numbers in slot counters, wherein the tags respectively include multiple slot counters, and respective tags replying to a reader if the value in the tag's slot counter becomes zero during an arbitration.

47. A method in accordance with claim 46 and comprising respectively decrementing the slot counters in response to a predetermined command from one of the readers for tags in an arbitration session with that reader.

48. A method in accordance with claim 45 and comprising storing in respective RFID tags a plurality of Q values, where Q represents the size of a slot counter, wherein respective Q values are stored for respective inventory session arbitrations.

49. A method in accordance with claim 45 and comprising storing, in respective RFID tags, a plurality of session values that identify which reader is attempting to inventory the tag, wherein respective session values are stored for respective inventory session arbitrations.

50. A method in accordance with claim 45 and comprising storing, in respective RFID tags, a plurality of RN values, which are random numbers used by respective readers as handles, wherein respective RN values are stored for respective inventory session arbitrations.

51. A method in accordance with claim 45 and comprising storing, in one of the readers, last used Q values for an arbitration, where Q represents the size of a slot counter.

52. A method in accordance with claim 45 and comprising storing, in one of the readers, last used arbitration mask values for an arbitration.

53. A method in accordance with claim 45 and comprising storing, in one of the readers, slot counter values for previously singulated tags.

54. A method in accordance with claim 45 and comprising storing, in one of the readers, a session number identifying an interrupted arbitration, and to associate stored Q values, handles, and slot counter values with the session number, where Q represents the size of a slot counter.

55. A method in accordance with claim 45 and further comprising coupling a reader controller to at least some of the readers controlling those readers using the reader controller.

56. An RFID reader comprising:
   memory configured to store a session number, and to store a last size of a slot counter and a last handle received from a tag in an arbitration session; and
   a transponder coupled to the memory and configured to selectively send a command to the tag to resume an interrupted arbitration session, the command including parameters for the session number, the last size of a slot counter, and the last handle read from the tag by the reader.

* * * * *